(12) United States Patent
Gottmann et al.

(10) Patent No.: US 7,045,238 B2
(45) Date of Patent: May 16, 2006

(54) SORFC POWER AND OXYGEN GENERATION METHOD AND SYSTEM

(75) Inventors: Matthias Gottmann, Sunnyvale, CA (US); James Frederick McElroy, Suffield, CT (US); Fred Mitlitsky, Livermore, CA (US); K. R. Sridhar, Los Gatos, CA (US)

(73) Assignee: Ion America Corporation, Sunnyvale, CA (US)

( * ) Notice: Subject to any disclaimer, the term of this patent is extended or adjusted under 35 U.S.C. 154(b) by 67 days.

(21) Appl. No.: 10/394,202

(22) Filed: Mar. 24, 2003

(65) Prior Publication Data

US 2004/0191598 A1 Sep. 30, 2004

(51) Int. Cl.
*H01M 8/10* (2006.01)
*C25C 1/00* (2006.01)

(52) U.S. Cl. .............. 429/30; 429/34; 429/17; 205/334; 205/628; 422/187

(58) Field of Classification Search .............. 429/30, 429/33, 19, 21, 17, 26; 205/50, 57, 58, 334, 205/345, 628; 55/309.1; 96/134; 180/54.1; 48/61, 198.1, 199 FM; 422/187
See application file for complete search history.

(56) References Cited

U.S. PATENT DOCUMENTS

| | | | |
|---|---|---|---|
| 4,452,676 A | 6/1984 | Birbara et al. | |
| 4,898,792 A | 2/1990 | Singh et al. | |
| 4,983,471 A | 1/1991 | Reichner et al. | |
| 5,047,299 A | 9/1991 | Shockling | |
| 5,143,800 A | 9/1992 | George et al. | |
| 5,169,730 A | 12/1992 | Reichner et al. | |
| 5,170,124 A | 12/1992 | Blair et al. | |
| 5,302,470 A | 4/1994 | Okada et al. | |
| 5,441,821 A | 8/1995 | Merritt et al. | |
| 5,498,487 A | 3/1996 | Ruka et al. | |
| 5,501,914 A | 3/1996 | Satake et al. | |
| 5,505,824 A * | 4/1996 | McElroy | 205/337 |
| 5,518,829 A | 5/1996 | Satake et al. | |
| 5,527,631 A | 6/1996 | Singh et al. | |
| 5,573,867 A | 11/1996 | Zafred et al. | |
| 5,595,949 A * | 1/1997 | Goldstein et al. | 502/20 |
| 5,601,937 A | 2/1997 | Isenberg | |
| 5,733,675 A | 3/1998 | Dederer et al. | |
| 5,741,605 A | 4/1998 | Gillett et al. | |
| 6,013,385 A | 1/2000 | DuBose | |
| 6,106,966 A | 8/2000 | Crow | |
| 6,280,865 B1 | 8/2001 | Eisman et al. | |
| 6,329,090 B1 | 12/2001 | McElroy et al. | |
| 6,403,245 B1 | 6/2002 | Hunt | |
| 6,436,562 B1 | 8/2002 | DuBose | |
| 6,511,017 B1 * | 1/2003 | Kirjavainen | 244/12.1 |
| 6,520,273 B1 * | 2/2003 | Ishikawa | 180/65.3 |
| 6,572,996 B1 | 6/2003 | Isenberg et al. | |
| 2002/0058175 A1 | 5/2002 | Ruhl | |
| 2003/0031901 A1 | 2/2003 | Breuer et al. | |
| 2003/0162067 A1 | 8/2003 | McElroy | |
| 2004/0034111 A1 * | 2/2004 | Tonkovich et al. | 518/726 |
| 2004/0081859 A1 * | 4/2004 | McElroy et al. | 429/1 |
| 2004/0175607 A1 * | 9/2004 | Itoh | 429/35 |
| 2004/0191595 A1 * | 9/2004 | McElroy et al. | 429/21 |

OTHER PUBLICATIONS

Cell and Stack Construction: Low-Temperature Cells, L.G. Austin, NASA SP-120, 1967.
Low Cost, High Efficiency Reversible Fuel Cell Systems, Proceedings of the 2002 U.S. DOE Hydrogen Program Review, NREL/CP-610-32405.
Low Cost Reversible Fuel Cell System, Proceedings of the 2000 U.S. DOE Hydrogen Program Review, Jun. 15, 2000, NREL/CP-570-28890.
Low Cost, Compact Solid Oxide Fuel Cell Generator, NASA Small Business Innovation Research Program.
Small, Ultra Efficient Fuel Cell Systems, Advanced Technology Program ATP 2001 Competition (Jun. 2002).
Low Cost, High Efficiency Reversible Fuel Cell (and Electrolyzer) Systems, Proceedings of the 2001 DOE Hydrogen Program Review NREL/CP-570-30535.
Regenerative Fuel Cells for High Altitude Long Endurance Solar Powered Aircraft, F. Mitlitsky, et al, 28$^{th}$ Intersociety Energy Conversion Engineering Conference (IECEC), Jul. 28, 1993, UCRL-JC-113485.
Unitized Regenerative Fuel Cells for Solar Rechargeable Aircraft and Zero Emission Vehicles, F. Mitlitsky, et al, 1994 Fuel Cell Seminar, Sep. 6, 1994, UCRL-JC-117130.
"High Temperature Electrolysis of Steam and Carbon Dioxide", Soren Hojgaard Jensen et al., from Proceedings of Riso International Energy Conference, held at Riso National Laboratory, Denmark, May 19-21, 2003, Riso-R-1405(CN), pp. 204-215, L.S. Peterson and H. Jensen, eds.

* cited by examiner

*Primary Examiner*—Raymond Alejandro
(74) *Attorney, Agent, or Firm*—Foley & Lardner LLP

(57) ABSTRACT

A solid oxide regenerative fuel cell system is used to supply power in a fuel cell mode and to generate metabolic oxygen and a hydrocarbon fuel reserve in an electrolysis mode. The system may also be used as a secondary power source or for energy peak shaving applications.

30 Claims, 6 Drawing Sheets

SORFC POWER AND OXYGEN GENERATION METHOD AND SYSTEM

BACKGROUND OF THE INVENTION

The present invention is generally directed to Solid Oxide Fuel Cells (SOFC's), and more specifically to reversible SOFC's referred to as Solid Oxide Regenerative Fuel Cells (SORFC's).

As resources on land become depleted, people have began to more actively explore options to exploit resources located under ground or under water. For example, natural resources, such as coal and oil are frequently located under ground or under water. However, exploitation of resources located under ground or under water is difficult because these locations often lack metabolic oxygen and a separate source of power to operate electronic equipment. Thus, humans are often forced to operate in closed environments that lack access to atmospheric air to exploit these resources.

Closed environments often require special features to maintain life and to accomplish desired activities. Oxygen gas is provided for metabolic use. Carbon dioxide is removed from the closed atmosphere. A stored fuel is used to provide energy to produce secondary electrical power. A secondary source of electric power is needed if the primary source of power is lost or the primary source of power has undesirable characteristics, such as noise, during certain desired activities.

In current closed environments, oxygen gas is generated for metabolic needs by electrolyzing water using a portion of the primary source of electrical power. Back up oxygen is stored as a high pressure gas in pressure vessels and as oxygen generating candles. Carbon dioxide is concentrated and stored and then discharged from the closed environment, sometimes violating the desired maintenance of the environment closure.

The byproduct of the water electrolysis is hydrogen gas. Hydrogen is a very difficult gas to store. It can be converted into a more storable compound, but it is often simply discharged, again violating the sometimes desired maintenance of the environment closure (i.e., breaching the closed environment by the exhaust of hydrogen).

Secondary electric energy is provided by rechargeable lead acid batteries. Because these batteries have a low energy density, only limited electric energy can be obtained within the allowed space. Additionally, if the primary power is not available the batteries are recharged from a diesel generator set. Because of the low efficiency of the diesel generator set, the fuel supply is large and the oxygen source is obtained from the air outside the closed environment, once more violating the desired maintenance of the environment closure (i.e., breaching the closed environment by the intake of oxygen).

SUMMARY OF THE INVENTION

A preferred embodiment of the present invention provides a terrestrial power generation system, comprising a solid oxide regenerative fuel cell, a hydrocarbon fuel source connected to the solid oxide regenerative fuel cell fuel inlet, wherein the solid oxide regenerative fuel cell is adapted to generate and provide a hydrocarbon fuel to the hydrocarbon fuel source in an electrolysis mode, and an oxygen source connected to the solid oxide regenerative fuel cell oxidizer inlet.

Another preferred embodiment of the present invention provides a terrestrial power and oxygen generation system, comprising a solid oxide regenerative fuel cell, and a life support system adapted to provide oxygen to support life. The oxygen outlet of the solid oxide regenerative fuel cell is operably connected to the life support system to provide oxygen from the solid oxide regenerative fuel cell to the life support system when the solid oxide regenerative fuel cell is operated in an electrolysis mode.

Another preferred embodiment of the present invention provides a method of generating power and oxygen using a terrestrial power and oxygen generation system, comprising operating a solid oxide regenerative fuel cell in a fuel cell mode to generate power, operating the solid oxide regenerative fuel cell in an electrolysis mode to generate oxygen and fuel, and providing the oxygen generated by the solid oxide regenerative fuel cell to a life support system.

Another preferred embodiment of the present invention provides a method of generating power, comprising providing power to a solid oxide regenerative fuel cell from an external power source when power demand on the external power source is below a predetermined amount, operating the solid oxide regenerative fuel cell in an electrolysis mode using the power provided from the external power source and generating and storing hydrocarbon fuel while the solid oxide regenerative fuel cell operates in the electrolysis mode. The method further includes providing the stored hydrocarbon fuel and oxygen to the solid oxide regenerative fuel cell, operating the solid oxide regenerative fuel cell in a fuel cell mode using the provided fuel and oxygen, and providing power from the solid oxide regenerative fuel cell operating in the fuel cell mode to the external power source when power demand on the external power source is above the predetermined amount or when the external power source experiences a power disruption.

Another preferred embodiment of the present invention provides an underwater vehicle, comprising an underwater vehicle body and a solid oxide regenerative fuel cell.

DETAILED DESCRIPTION OF THE PREFERRED EMBODIMENTS

The present inventors have realized that an SORFC system may be used generate oxygen and a hydrocarbon fuel in an electrolysis mode and to generate power using the stored hydrocarbon fuel in the fuel cell mode. Thus, the SORFC system may be used to generate oxygen, hydrocarbon fuel and power in various closed environments without breaching the closed environment. Preferably, the closed environment contains a primary power source and the SORFC is a secondary power source.

In the oxygen generation electrolysis mode, the SORFC not only electrolyzes water but carbon dioxide as well. Many advantages accrue from this capability, including appreciably consuming accumulated carbon dioxide, reducing its required storage volume, easily converting hydrogen and carbon monoxide byproducts into useful storable hydrocarbon fuel, and enhancing the overall efficiency of the process. For example, the hydrocarbon fuel may be a methane fuel, a mixture of methane and other fuels or hydrocarbon fuels other than methane. The stored volumes of all the accumulated fluids (e.g. oxygen, carbon dioxide, and methane) are minimized by liquefaction using a primary electrical energy source. Furthermore, formation and storage of a hydrocarbon fuel, such as methane, is sometimes preferable to formation and storage of hydrogen, because it generally takes less heat to form a hydrocarbon fuel from water and carbon dioxide than it takes to form hydrogen from electrolysis of water. Still further, a pure hydrocarbon fuel, such as pure methane, is typically formed and stored during the electrolysis mode. It is preferred, but not required, to use the stored pure hydrocarbon fuel during the electrical power generation fuel cell mode instead of an impure fuel, such as natural gas provided from a gas pipe line, because natural gas contains deleterious nitrogen and sulfur.

In the electrical power generation fuel cell mode, the SORFC produces electric energy using the previously generated and liquefied hydrocarbon fuel, such as methane, and oxygen as the reactants. Carbon dioxide and water are the byproducts of the SORFC in the electrical power generating fuel cell mode. The carbon dioxide is liquefied using the heat for vaporizing of the oxygen and methane. The high efficiency of the SORFC in the fuel cell mode combined with the lack of requiring electrical power for liquefying the carbon dioxide, allows much greater energy density than with lead acid batteries. Alternatively, if desired, the reactants, such as fuel, oxygen and carbon dioxide may be stored in gas rather than liquid form.

Thus, the closed environment can be maintained for extended periods of time without violation or breach by using a SORFC as a secondary power source and as an oxygen generator. Additionally, the lead acid batteries and the diesel generator set can be eliminated and the closed environment will have freed volume for other useful purposes. While the SORFC system described herein is preferably used in a closed environment, the SORFC system may be used in any other suitable open environment as well.

In a preferred embodiment, the environment is closed with sufficient liquid oxygen and liquid methane to provide emergency or quiet power and metabolic oxygen during the fuel cell operational mode. These liquids remain unused while the primary power is available. During electrolysis mode the SORFC operates to just produce the metabolic oxygen needs from water and expired carbon dioxide. The byproducts, hydrogen and carbon monoxide are converted to methane and water within a Sabatier reactor. The methane is separated from the water, liquefied, and added to the partially filled liquid methane storage vessel. In this stage, the liquid oxygen vessel remains full and the liquid carbon dioxide and liquid methane vessels fill very slowly.

When the primary power is terminated, either through emergency or a planned quiet period, the SORFC converts to operating in a fuel cell mode to make the required electrical power. Oxygen from liquid storage is vaporized to support the continued metabolic use and to provide the SORFC with oxidant reactant. Stored liquid methane is also vaporized to provide the SORFC with fuel reactant. High efficiency electric power is produced within the SORFC as are byproducts water and carbon dioxide. The carbon dioxide is separated from the water, liquefied, and added to the partially filled liquid carbon dioxide storage vessel. Liquefaction is accomplished by using the cooling effect of the oxygen and methane vaporization.

When the primary power is restored the SORFC reverts to the electrolysis mode. At this point the rate of electrolysis is significantly increased. The increased rate is accomplished to recharge the used fuel cell mode reactants as well as provide the continued metabolic oxygen requirements. During this time stored liquid carbon dioxide is vaporized and fed to the SORFC along with water to produce oxygen and methane. All of the generated oxygen in excess of the metabolic rate is liquefied and fed to the liquid oxygen vessel. All of the methane is separated from the water, liquefied and fed to the liquid methane storage vessel. When the liquid oxygen pressure vessel is filled the SORFC electrolysis rate is reduced to match the continuing metabolic requirements. The above cycle can be repeated multiple times and the overall duration is limited only by the size of the liquid storage vessels.

The SORFC is preferably located in one or more of the following closed environments, such as an underground location that lacks access to atmospheric air, such as a mining tunnel, a manned or unmanned high altitude aircraft that is adapted to operate in a rarefied or an airless environment, a manned or unmanned terrestrial orbit space craft that is adapted to operate in an airless environment, and an underwater location that lacks access to atmospheric air, such as a manned or unmanned underwater vehicle or a sea bed habitat or research station. Preferably, the SORFC is used in a terrestrial location (i.e., on Earth, under water, under ground or in Earth orbit, but not in outer space or on another planet).

For example, the SORFC may be used in an underwater vehicle, which includes an underwater vehicle body, the SORFC system and a primary power generator as the primary power source. The SORFC is adapted to generate power in a fuel cell mode when the primary power generator is off and to generate metabolic oxygen for an underwater vehicle crew life support system in an electrolysis mode when the primary power generator provides power to the SORFC. The SORFC may also be used to generate heat to heat the underwater vehicle in the fuel cell and electrolysis modes. Preferably, the underwater vehicle lacks a diesel engine and lacks a battery which provides power to the underwater vehicle propulsion system.

In operation, the underwater vehicle leaves port with an oxygen storage vessel about full, a hydrocarbon storage vessel partially full and a carbon dioxide storage vessel about empty. The primary power generator provides power to the SORFC in the electrolysis mode to generate and store oxygen and hydrocarbon fuel. Then, the stored oxygen and hydrocarbon fuel are used to generate power and to generate and store carbon dioxide when the SORFC operates in the fuel cell mode. The underwater vehicle returns to port with the oxygen storage vessel about full, the hydrocarbon storage vessel about full and the carbon dioxide storage vessel about full.

In another preferred embodiment of the present invention, the solid oxide regenerative fuel cell and the life support system are located in a building where the whole building or at least a portion thereof can be sealed from outside atmosphere, either permanently or in certain situations. For example, the building may comprise a chemical or semiconductor plant or a designated shelter.

The solid oxide regenerative fuel cell operates in the electrolysis mode and provides oxygen to the life support system when the building is sealed from outside atmosphere. For example, the building or a portion thereof may be sealed from outside atmosphere in case of an industrial accident or a deliberate act which releases harmful chemical or biological agents into the atmosphere. Alternatively, a portion of the building may comprise a clean room which is permanently sealed from outside atmosphere, such as in a semiconductor plant.

The solid oxide regenerative fuel cell provides power to the building in a fuel cell mode. The solid oxide regenerative fuel cell also provides waste heat in the fuel cell and electrolysis modes for at least one building appliance, such as an air conditioning system, a hot water heater, a refrigeration system or a cooking appliance located in the building. If the portion of the building is permanently sealed, such as a clean room in a semiconductor plant, then the building may optionally contain two separate solid oxide regenerative fuel cell systems which continuously supply power and oxygen to the building. One fuel cell may operate in the electrolysis mode to provide oxygen to the building life support system and fuel to the second fuel cell. The second fuel cell may operate in the fuel cell mode to provide power to the building and/or to the first fuel cell using atmospheric oxygen and the fuel generated by the first fuel cell. Alternatively, each fuel cell may use its own fuel supply and the operating modes of the two fuel cells are periodically switched to keep one fuel cell running in electrolysis mode and the other fuel cell in the fuel cell mode and vise versa.

Figure 1:
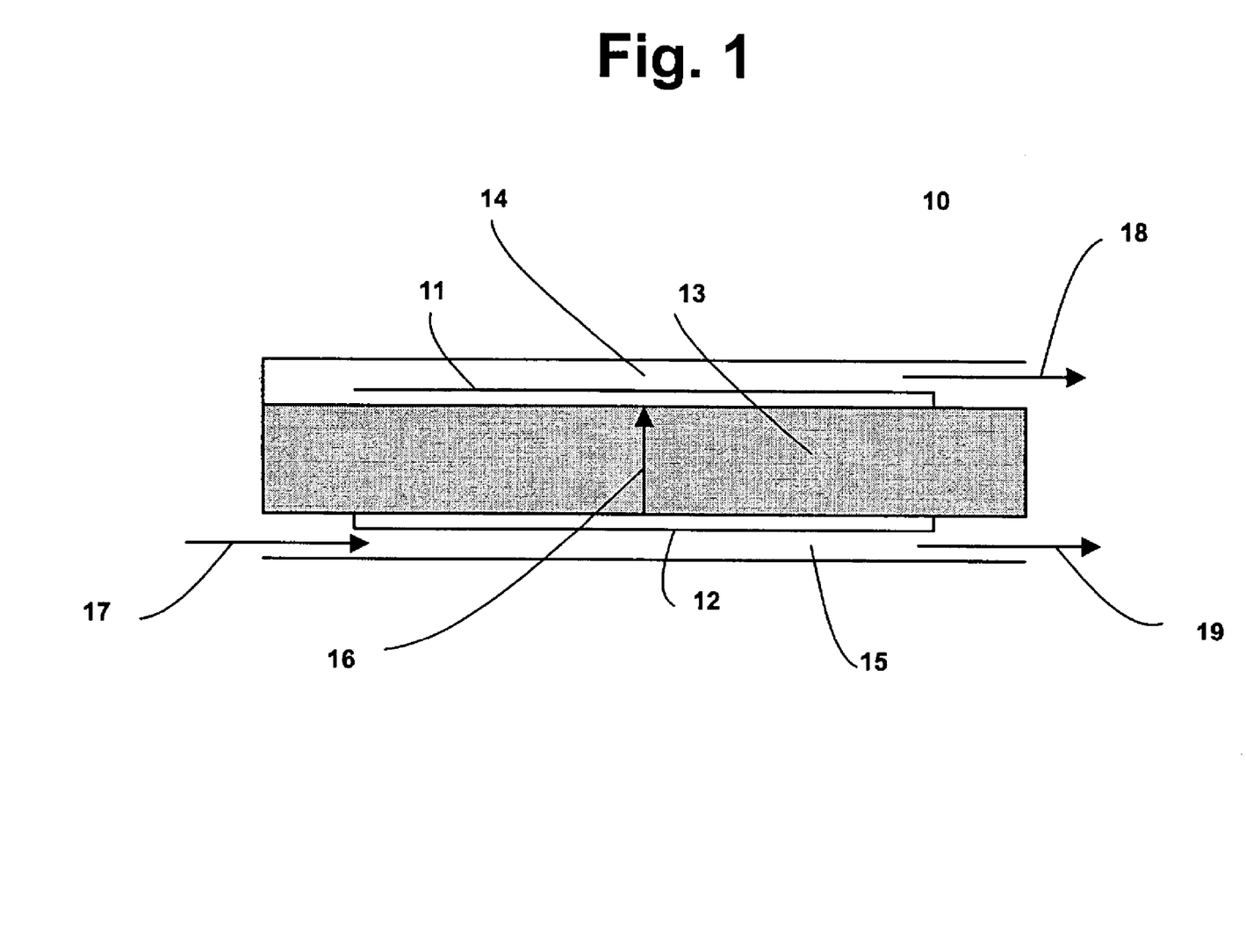
FIG. 1 is a schematic cross section of a single SORFC operating in the electrolysis mode according to a preferred embodiment of the present invention.

A single SORFC 10 operating in the electrolysis mode is shown in FIG. 1. The SORFC contains an anode electrode, an electrolyte and a cathode electrode. Anode electrode 11 is preferably a porous electrode comprising perovskites, metals and/or cermets. Preferably, the anode electrode comprises a perovskite material. Cathode electrode 12 is also preferably a porous electrode comprising platinum or platinum family metals. Preferably, the cathode electrode comprises platinum. Solid oxide electrolyte 13 is sheet of ceramic material, such as yttria stabilized zirconia. Electrodes 11 and 12 are attached to electrolyte 13. An anode gas chamber 14 is formed between the electrolyte 13 and an anode side interconnect (not shown for simplicity). A cathode gas chamber 15 is formed between the electrolyte 13 and a cathode side interconnect (also not shown for simplicity).

A gas mixture 17 containing primarily water vapor and carbon dioxide is introduced into the cathode gas chamber 15. A direct current power source (not shown) is connected to the anode electrode 11 and the cathode electrode 12 in such a way that when electrical current is flowing, the anode electrode 11 takes on a positive voltage charge and the cathode electrode 12 takes on a negative voltage charge. When the electric current is flowing, the gas mixture 17 containing primarily water vapor and carbon dioxide gives up oxygen ions 16 to form cathode discharge mixture 19 consisting primarily of hydrogen and carbon monoxide. Oxygen ions 16 transport across the electrolyte 13 under the electrical current. The oxygen ions 16 are converted into oxygen gas 18 on the anode electrode 11 under the influence of the electrical current. The oxygen gas 18 is discharged from the anode chamber 14.

Figure 2:
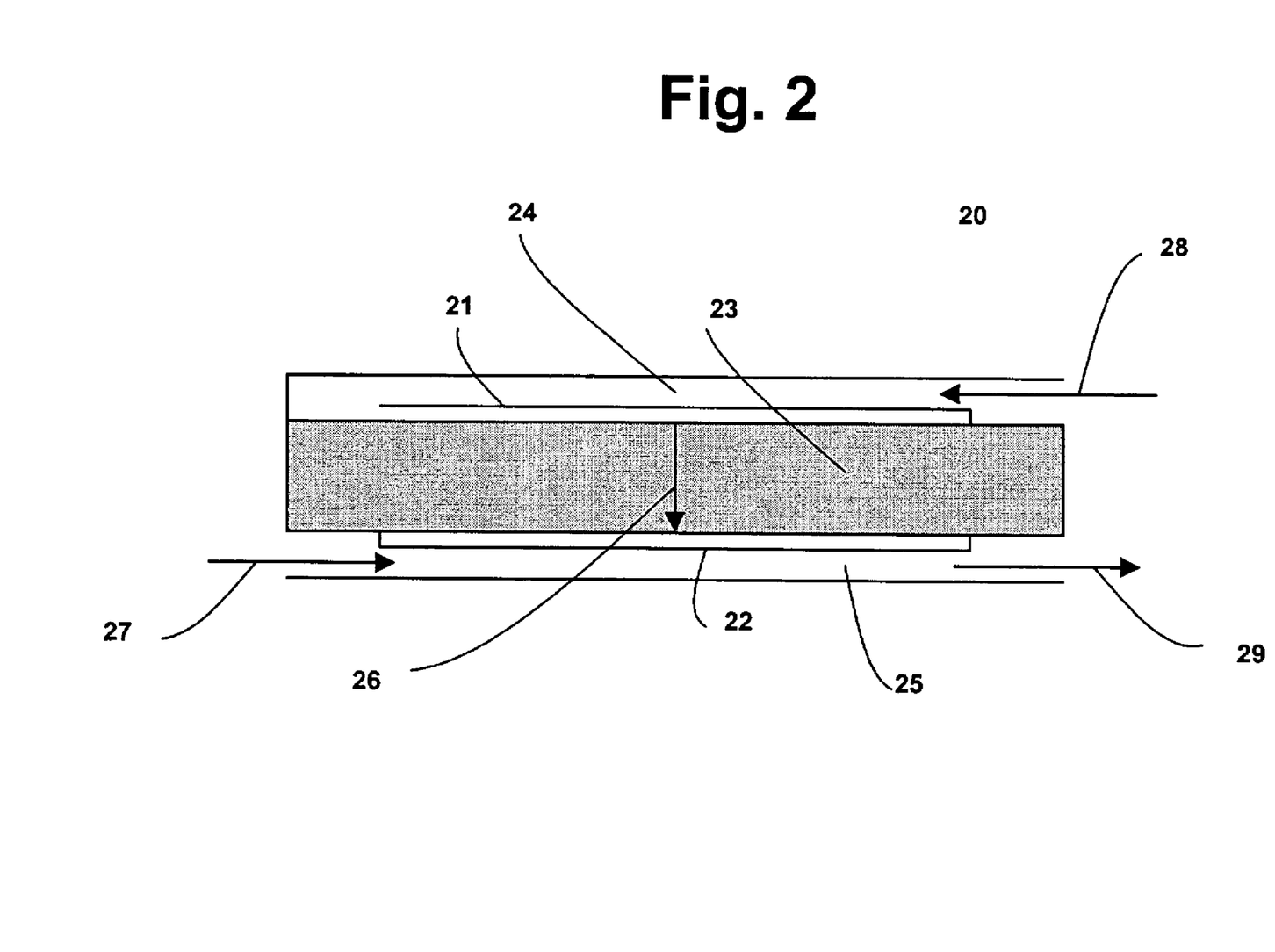
FIG. 2 is a schematic cross section of a single SORFC operating in the fuel cell mode according to a preferred embodiment of the present invention.

A single SORFC 20 operating in the fuel cell mode is shown in FIG. 2. SORFC 20 is the same as SORFC 10, except that the cathode and anode designations of its electrodes are reversed. Cathode electrode 21 is the same electrode as that identified as the anode electrode 11 in FIG. 1 when operating in the electrolysis mode. Anode electrode 22 is the same electrode as that identified as the cathode electrode 12 in FIG. 1 when operating in the electrolysis mode. Solid oxide electrolyte 23 is the same electrolyte as that identified as electrolyte 13 in FIG. 1 when operating in the electrolysis mode. Cathode gas chamber 24 is the same gas chamber as that identified as the anode gas chamber 14 in FIG. 1 when operating in the electrolysis mode. Anode gas chamber 25 is the same gas chamber as that identified as the cathode gas chamber 15 in FIG. 1 when operating in the electrolysis mode.

A gas mixture 27 containing primarily water vapor and methane is introduced into the anode gas chamber 25. Oxygen gas 28 is introduced into the cathode chamber 24. An electrical fuel cell load (not shown) is applied to the SORFC 20 and the oxygen gas 28 forms oxygen ions 26 under the influence of the electrical load. Oxygen ions 26 transport across the electrolyte 23 under the influence of the electrical current. On the anode electrode 22, the oxygen ions 26 combine with carbon and hydrogen from gas mixture 27 to form gas mixture 29 containing primarily carbon dioxide and water vapor. Gas mixture 29 is discharged from the anode chamber. In the process described above, the SORFC 20 has made electrical energy or power, which is output through its electrodes.

Figure 3:
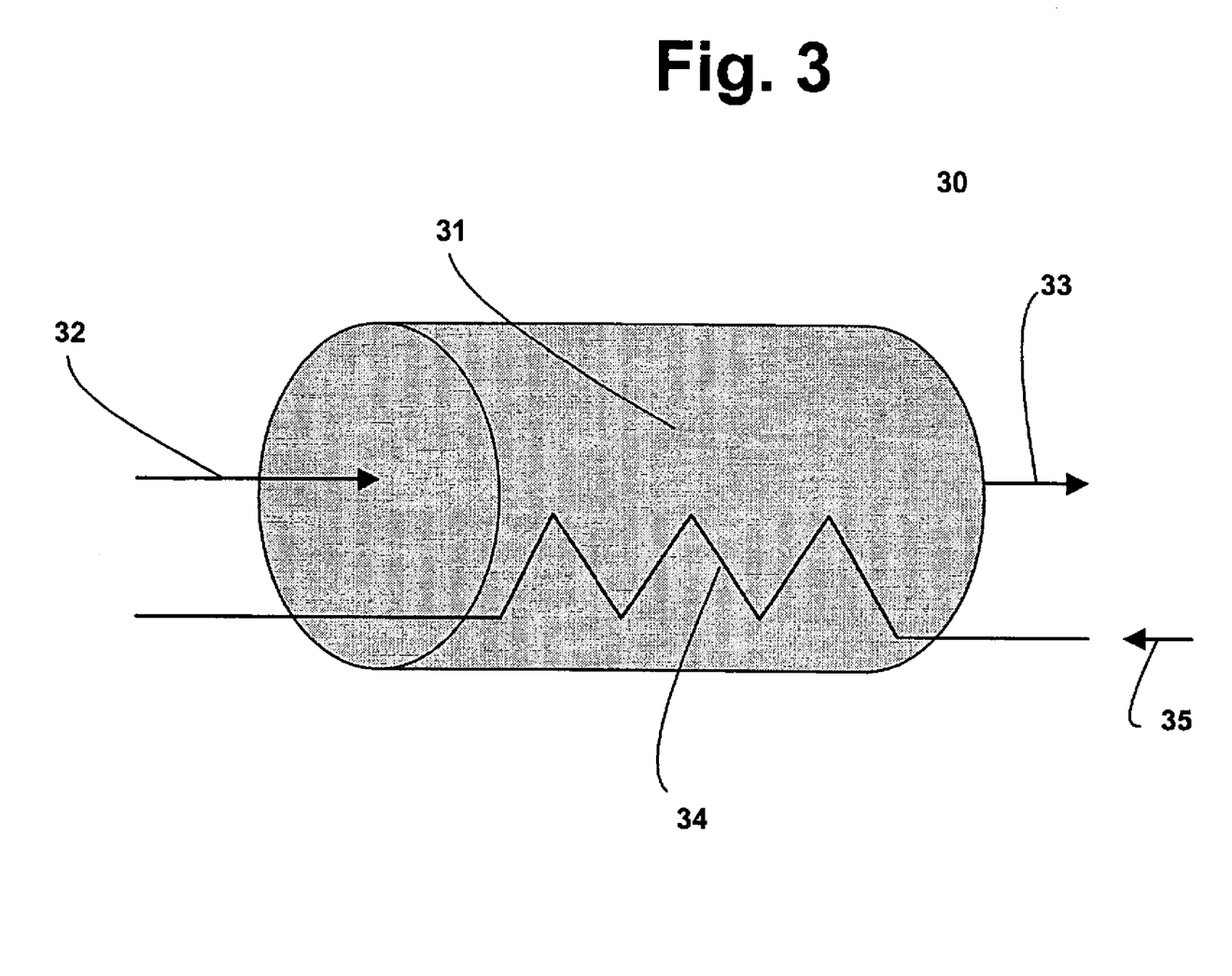
FIG. 3 is a schematic side of view of a Sabatier reactor according to a preferred embodiment of the present invention.

A Sabatier reactor subsystem 30 is shown in FIG. 3. The reactor tube 31 contains a catalyst, such as a platinum family metal on an alumina support. Preferably, the catalyst comprises ruthenium. A gas mixture 32 consisting primarily of hydrogen and carbon monoxide is introduced into reactor tube 31 and contacts the catalyst therein. The gas mixture 32 undergoes an immediate exothermic reaction and produces gas mixture 33 consisting primarily of methane and water vapor. Gas mixture 33 is then discharged from the reactor tube 31. When the Sabatier reactor is used with the SORFC 10 operating in the electrolysis mode, the hydrogen and carbon dioxide discharge mixture 19/32 is provided from the SORFC into the Sabatier reactor 30.

Because the reaction within reactor tube 31 is highly exothermic, a heat exchanger 34 is used to capture the generated heat. Gas mixture 35, consisting primarily of carbon dioxide and water, flows through heat exchanger 34 to absorb the exothermic reaction heat. When the Sabatier reactor is used with the SORFC 10 operating in the electrolysis mode, the water vapor and carbon dioxide inlet mixture 17/35 is heated in the Sabatier reactor by the reaction of the outlet or discharge mixture 19/32. The water vapor and carbon dioxide inlet mixture 17/35 is then provided from the Sabatier reactor into the SORFC 10.

Figure 4:
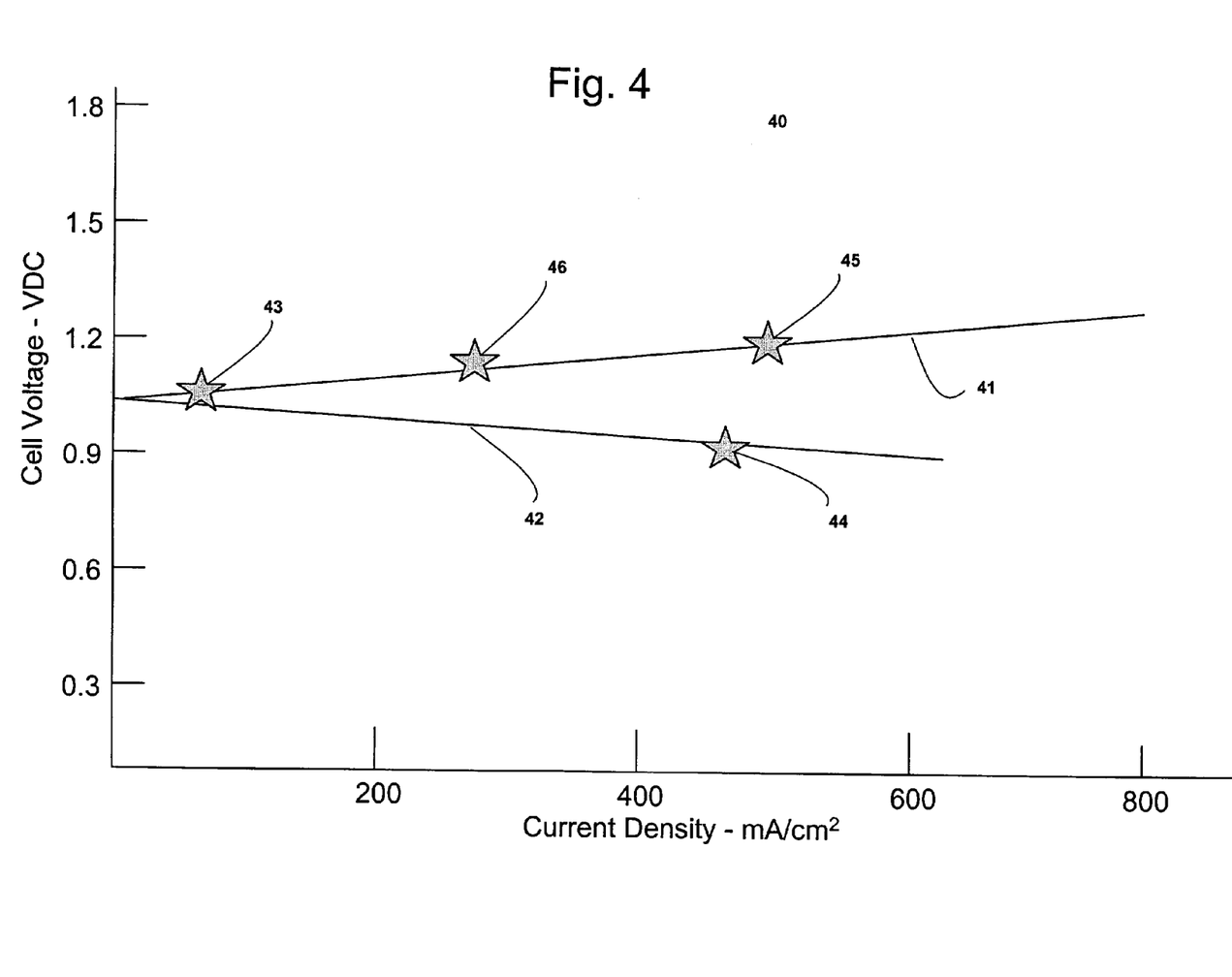
FIG. 4 is a voltage/current plot of a single SORFC cell showing the typical electrolysis and fuel cell performance according to a preferred embodiment of the present invention.

Typical solid oxide single cell electrical performance 40 is shown on FIG. 4. Electrolysis mode electrical performance 41 describes the general cell voltage-current relationship when the cell is electrolyzing a mixture of water vapor and carbon dioxide in a temperature range of 600 C to 1000 C. Fuel cell mode electrical performance 42 describes the general cell voltage-current relationship when the cell is producing electrical power from methane and oxygen reactants operating in a temperature range of 600 C to 1000 C. Fuel cell operating point 44 is an example of a high current density performance level commensurate with providing all the required electrical power. Electrolysis operating point 43 is an example of a low current density performance level commensurate with the cell just providing metabolic oxygen. Electrolysis operating point 45 is an example of a high current density performance level commensurate with providing metabolic oxygen and recharging the fuel cell reactants at the same rate they were consumed while in the fuel cell mode. Electrolysis operating point 46 is an example of an intermediate current density performance level commensurate with providing metabolic oxygen and recharging the fuel cell reactants at half the rate they were consumed while in the fuel cell mode.

Figure 5:
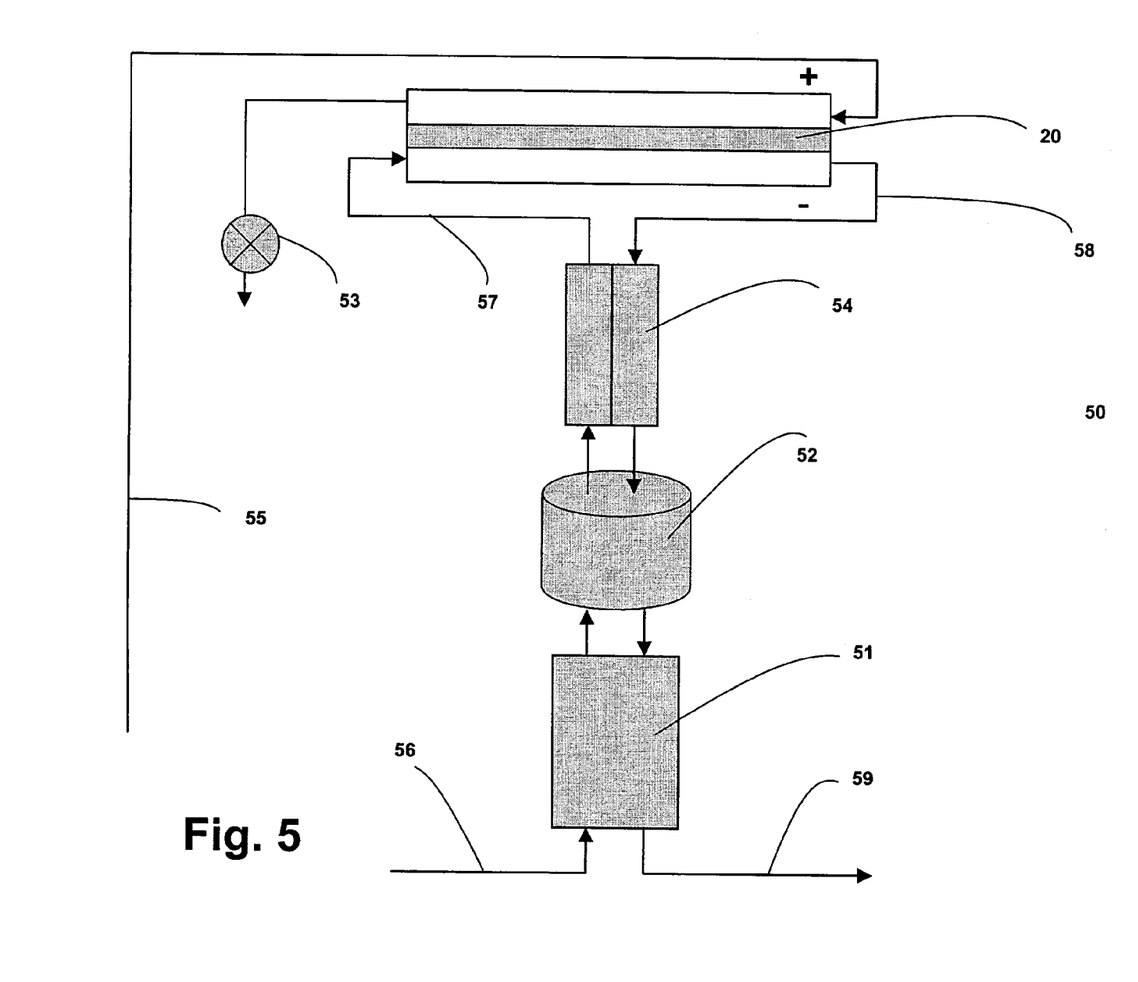
FIG. 5 is a system schematic of the major SORFC components operating in the fuel cell mode, according to a preferred embodiment of the present invention.

The SORFC system 50 of a preferred embodiment operating in a fuel cell mode is shown of FIG. 5 as a simplified schematic. A single SORFC 20 previously shown in FIG. 2 as a cross section operating in the fuel cell mode is shown again on FIG. 5. While a single SORFC is shown, it should be understood that the system 50 contains a plurality of SORFC stacks. A hydrogen recovery unit 51 transfers hydrogen gas from within a first gas mixture stream into a second gas stream. The hydrogen recovery unit 51 can be a device which recovers hydrogen based on absorption/adsorption processes or based on an electrochemical proton exchange process. The electrochemical exchange process is preferred.

An enthalpy recovery unit 52 transfers water vapor from first gas stream to a second gas stream. The enthalpy recovery unit 52 can be a device which transfers water vapor based on cyclic desiccant beds or a rotating desiccant wheel. The desiccant wheel (i.e., "enthalpy wheel") is preferred. Purge valve 53 is a normally closed powered open solenoid valve. A heat exchanger 54 is a counter flow gas-gas heat exchanger. The SORFC power output, such as output electrode(s), is connected to a power distribution system. The oxidizer (i.e., oxygen or air) enters the system 50 through the oxidizer inlet or conduit 55, while the fuel enters the system through the fuel inlet or conduit arrangement 56/57. The fuel exhaust exits through conduit arrangement 58/59.

A method of operating the system 50 in the fuel cell mode is now described. Within the SORFC system 50 shown in FIG. 5, pure oxygen reactant gas is delivered from an oxygen storage vessel, such as a liquid oxygen tank, to the cathode chamber of SORFC 20 through inlet conduit 55. The oxygen reactant, being highly pure, is normally dead headed within the cathode chamber of SORFC 20. However, even the purest of gases will include trace non reactant gas species. As a result the cathode chamber of SORFC 20 must be occasionally purged of these non reactant species. Oxygen purge valve 53 is used to accomplish this purging.

High purity hydrocarbon inlet stream, such as a methane stream, is introduced into the SORFC system 50 from a hydrocarbon storage vessel, such as a tank (not shown for clarity), through conduit 56 into the hydrogen recovery unit 51. Within the hydrogen recovery unit 51 hydrogen, gas is transferred from the fuel exhaust outlet stream in conduit 58 into the methane stream. This hydrogen supports a uniform methane reformation process within the anode chamber of SORFC 20. The methane and hydrogen mixture next is introduced into the enthalpy recovery unit 52, where a portion of the water vapor is transferred from the fuel exhaust outlet stream in conduit 58 into the methane and hydrogen inlet stream. Preferably, the enthalpy recovery unit also transfers heat from the outlet stream to the inlet stream. From the enthalpy recovery unit 52, the methane, hydrogen and water vapor mixture is introduced into the heat exchanger 54, where the gas mixture temperature is increased near to the operational temperature of 600 C to 1000 C using the high temperature waste heat from the outlet stream in conduit 58. From heat exchanger 54, the hot mixture of methane, hydrogen, and water vapor is delivered to the anode chamber of SORFC 20 through conduit 57. Some steam reformation of the methane will occur in the heat exchanger 54 and conduit 57 but the amount is suppressed by the existence of the hydrogen. The completion of the steam reforming of the methane is accomplished in the anode chamber of the SORFC 20.

Within the anode chamber of the SORFC 20, the steam reforming of methane and the oxidation of carbon and hydrogen in the fuel cell reactions converts the discharged gas mixture (i.e., fuel exhaust) in conduit 58 to carbon dioxide, additional water vapor, and excess hydrogen. The discharged gas mixture in conduit 58 passes through heat exchanger 54, releasing waste heat, and then through the enthalpy recovery unit 52 to supply a portion of the water vapor to support the input methane reformation. The discharged gas mixture in conduit 58 is then directed to the hydrogen recovery unit 51 where virtually all but trace quantities of the hydrogen is transferred to the inlet methane stream. Using the preferred electrochemical proton exchange process as the hydrogen recovery unit 51, provides an exact measure of the hydrogen content within the discharged gas mixture in conduit 58 which is used to adjust the input methane flow rate. The outlet mixture in conduit 59 from hydrogen recovery unit 51 contains only carbon dioxide and water which are stored separately (not shown).

Figure 6:
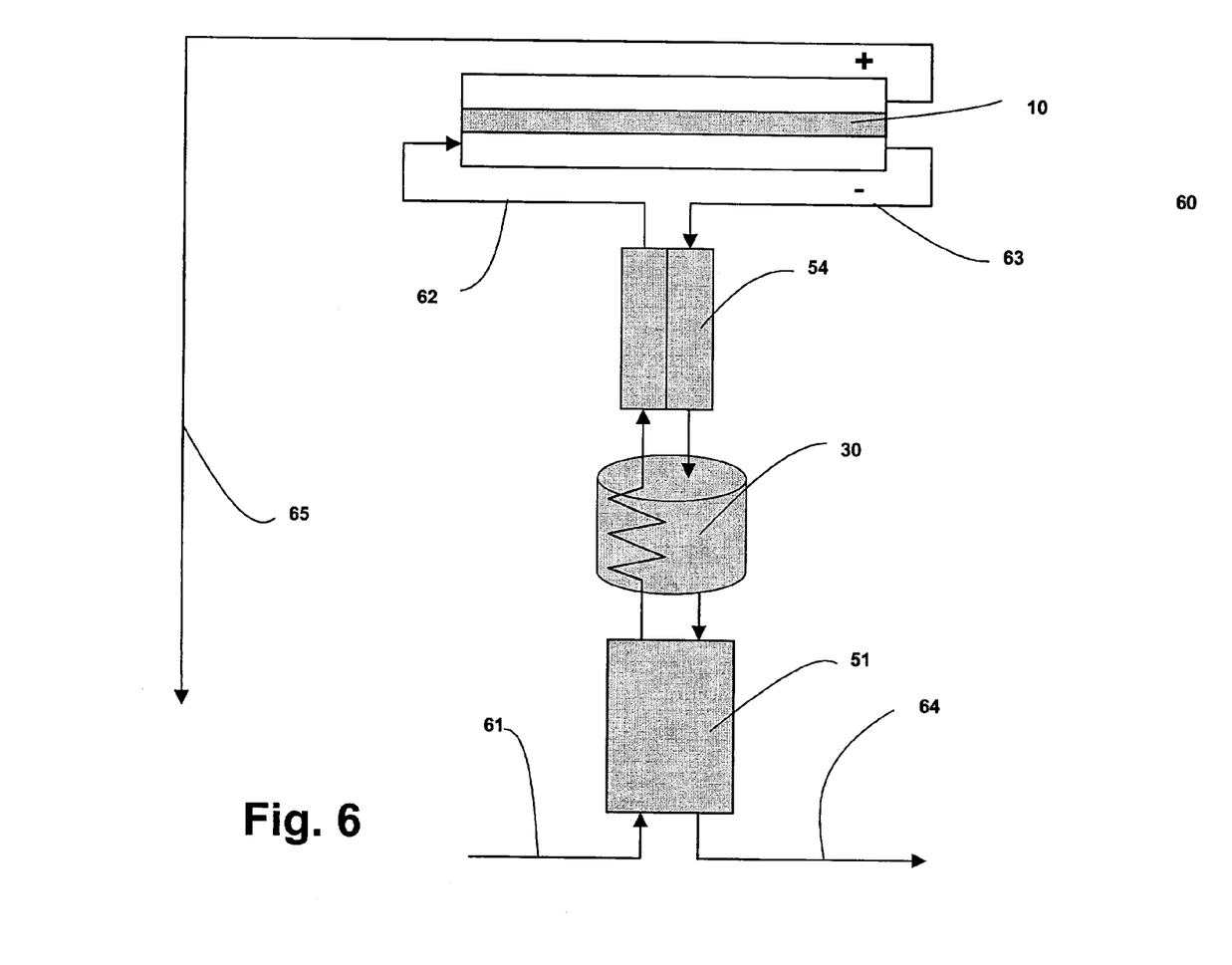
FIG. 6 is a system schematic of the major SORFC components operating in the electrolysis mode, according to a preferred embodiment of the present invention.

The SORFC system 60 of a preferred embodiment operating in an electrolysis mode is shown of FIG. 6 as a simplified schematic. A single SORFC 10 previously shown in FIG. 1 as a cross section operating in the electrolysis mode is shown again in FIG. 6. The hydrogen recovery unit 51 transfers hydrogen gas from within a first gas mixture stream into a second gas stream. The hydrogen recovery unit 51 can be a device which recovers hydrogen based on absorption/adsorption processes or based on an electrochemical proton exchange process. The electrochemical exchange process is preferred.

The Sabatier reactor subsystem 30, described with respect to FIG. 3, converts carbon monoxide and hydrogen into methane and water vapor. The heat exchanger 54 is a counter flow gas-gas heat exchanger. Carbon dioxide and water enter the system 60 through inlet or conduit 61, which may be the same or different than conduit 56, shown in FIG. 5. The generated oxygen exits through outlet or conduit 65, while the methane and water exit through outlet or conduit arrangement 63/64. Conduits 63/64 and 65, respectively, may be the same or different conduits as conduits 58/59 and 55, respectively, shown in FIG. 5.

Thus, the system 60 operating in the electrolysis mode is the same system as system 50 operating in the fuel cell mode, except that the inlet and outlet streams are steered through the Sabatier reactor subsystem 30 instead of through the enthalpy recovery unit 52, which remains inactive in the electrolysis mode. The inlet and outlet streams may be steered using valves and parallel conduits (not shown for clarity). Furthermore, the electrode designations in the SORFC 10 of system 60 are reversed compared to SORFC 20 of system 50, as explained in detail with respect to FIGS. 1 and 2 above.

A method of operating the system 60 in the electrolysis mode is now described. Carbon dioxide and water are introduced into the SORFC system 60 through conduit 61 into hydrogen recovery unit 51. Carbon dioxide may be introduced from a carbon dioxide storage vessel or directly from living beings being supported by the life support system. Within the hydrogen recovery unit 51, hydrogen gas is transferred from the outlet stream in conduit 63 into the carbon dioxide and water inlet stream. This extra hydrogen eventually assures that all the carbon bearing gases are converted into methane within the Sabatier reactor subsystem 30. The carbon dioxide, water, and hydrogen inlet mixture next is introduced into the Sabatier subsystem 30 heat exchanger where it is heated by the exothermic reaction. From the Sabatier subsystem 30, the carbon dioxide, hydrogen and water vapor mixture is introduced into the heat exchanger 54, where the gas mixture temperature is increased further to near to the operational temperature of 600 C to 1000 C using the high temperature waste heat from the outlet stream in conduit 63. From heat exchanger 54, the hot mixture of carbon dioxide, hydrogen, and water vapor is delivered to the cathode chamber of SORFC 10 through conduit 62. Within the cathode chamber of SORFC 10, the carbon dioxide and water vapor are reduced by electrolysis to carbon monoxide and hydrogen. Excess water and some unreacted carbon dioxide will be discharged from the cathode chamber of SORFC 10 along with the carbon monoxide and hydrogen through conduit 63.

The discharged gas mixture in conduit 63 passes through heat exchanger 54 releasing waste heat to the inlet stream and then through the Sabatier subsystem 30 to convert all the carbon oxides to methane and water with the excess hydrogen. The discharged gas mixture in conduit 63 is then directed to the hydrogen recovery unit 51 wherein virtually all but trace quantities of the hydrogen is transferred to the inlet carbon dioxide and water stream. Using the preferred electrochemical proton exchange process as the hydrogen recovery unit 51, provides an exact measure of the hydrogen content within the discharged gas mixture in conduit 63 which is used to adjust the input carbon dioxide flow rate. The outlet mixture in conduit 64 from hydrogen recovery unit 51 contains only methane and water which are stored separately (not shown).

In the meantime, pure oxygen gas is generated in the SORFC 10 anode during the electrolysis process. The oxygen is discharged from the SORFC 10 anode through conduit 65 and on to direct metabolic use or to direct metabolic use and liquefied storage (not shown). Thus, the SORFC system includes a means, such as the conduit 65, for providing oxygen to a life support system when the SORFC is operated in the electrolysis mode. In other words, the oxygen outlet 65 of the solid oxide regenerative fuel cell is operably connected to the life support system (not shown for clarity) to provide oxygen from the solid oxide regenerative fuel cell to the life support system when the solid oxide regenerative fuel cell is operated in an electrolysis mode. For example, "operably connected" includes directly connecting conduit 65 to the life support system as well as transferring the generated oxygen to an intermediate location, such as an oxygen storage vessel, from which oxygen is transferred to the life support system.

In an alternative embodiment of the present invention, the SORFC system 50/60 further comprises a renewable energy source, such as a solar cell or a wind turbine electrically connected to the SORFC. In this embodiment, the SORFC is preferably but not necessarily located in an open rather than in a closed location. For example, the SORFC system may be located in a remote location that is not connected to a terrestrial power grid and may not be easily accessible for delivery of fuel. The SORFC is electrically connected to the renewable energy source and the SORFC is adapted to regenerate oxygen and fuel in electrolysis mode when power is provided to the SORFC from the renewable energy source (such as on a windy or sunny day). The SORFC is adapted to generate power in a fuel cell mode from the regenerated fuel when the renewable energy source is not generating power, such as when there is no wind (i.e., on a calm day) or no sun (i.e., on a cloudy day or at night). Therefore, the system may provide continuous power without a regular delivery or resupply of fuel. Thus, the system which includes a SORFC and the intermittent renewable energy source is adapted to provide continuous power to a remote location that may lack access to a power grid or be readily accessible for delivery of fuel.

In another alternative embodiment of the present invention, the SORFC system 50/60 is used for peak shaving. The SORFC system may be located in a closed environment, such as a mining tunnel, airplane, or underwater vehicle, or in an open environment, such as a building.

In peak shaving, power is provided to the SORFC from an external power source when power demand on the external power source is below a predetermined amount. At this time, the SORFC is operated in an electrolysis mode using the power provided from the external power source. The SORFC generates hydrocarbon fuel, such as methane, when the SORFC operates in the electrolysis mode. The generated fuel is stored in a fuel storage vessel.

In contrast, when power demand on the external power source is above the predetermined amount or when the external power source experiences a power disruption, the SORFC is operated in a fuel cell mode and power is provided from the SORFC operating in the fuel cell mode to the external power source. The SORFC generates power when the stored fuel and oxygen are provided to and reacted in the SORFC.

The external power source may comprise any suitable source, such as a terrestrial, vehicle, ship or underwater vehicle power grid. Thus, the power may be provided to the SORFC from the power grid when power demand on the power grid is below a peak load. In contrast, the power may be provided from the SORFC operating in the fuel cell mode to the power grid when power demand on the power grid is above the peak load. For example, the power is provided to the SORFC from the power grid during night time, and the power is provided from the SORFC operating in the fuel cell mode to the power grid during day time. In another example, the power is provided from the SORFC operating in the fuel cell mode to the power grid when the power grid experiences a power outage. While a hydrocarbon fuel is preferred, the SORFC may use a hydrogen fuel instead, especially if the SORFC is located in an open environment, such as a building.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

We claim:

1. A terrestrial power generation system, comprising:
   a solid oxide regenerative fuel cell;
   a carbon dioxide storage tank connected to the solid oxide regenerative fuel cell, wherein the carbon dioxide storage tank stores carbon dioxide generated by the solid oxide regenerative fuel cell operating in a fuel cell mode and provides the stored carbon dioxide to the solid oxide regenerative fuel cell when the solid oxide regenerative fuel cell is operating in an electrolysis mode;

a hydrocarbon fuel source connected to the solid oxide regenerative fuel cell fuel inlet, wherein the hydrocarbon fuel source receives a hydrocarbon fuel generated from an output of the solid oxide regenerative fuel cell operating in the electrolysis mode; and an oxygen source connected to the solid oxide regenerative fuel cell oxidizer inlet.

2. The system of claim 1, wherein:

the solid oxide regenerative fuel cell is adapted to generate power in a fuel cell mode from stored oxygen supplied from the oxygen source and from fuel supplied from the hydrocarbon fuel source; and the solid oxide regenerative fuel cell is adapted to generate metabolic oxygen for a life support system in the electrolysis mode when power is provided to the solid oxide regenerative fuel cell.

3. The system of claim 2, wherein the system is located in an underwater vehicle.

4. The system of claim 2, wherein the system is located in a high altitude aircraft or terrestrial orbit space craft that is adapted to operate in rarefied air or an airless environment.

5. The system of claim 2, wherein the system is located in an underground or underwater location that lacks access to atmospheric air.

6. The system of claim 2, wherein:

the hydrocarbon fuel source comprises a methane storage vessel which is adapted to store methane generated from the output of the solid oxide fuel cell operating in the electrolysis mode and which is adapted to supply methane to the solid oxide fuel cell operating in the fuel cell mode;

the oxygen source comprises an oxygen storage vessel;

the solid oxide regenerative fuel cell is adapted to generate power in the fuel cell mode by converting oxygen and methane into carbon dioxide and water vapor;

the solid oxide regenerative fuel cell is adapted to generate the metabolic oxygen for the life support system in the electrolysis mode when power, water vapor and carbon dioxide are provided to the solid oxide regenerative fuel cell; and the solid oxide regenerative fuel cell is adapted to generate heat in the fuel cell mode and in the electrolysis mode.

7. The system of claim 6, further comprising:

a plurality of solid oxide regenerative fuel cell stacks.

8. The system of claim 7, further comprising:

a Sabatier reactor adapted to convert hydrogen and carbon monoxide emitted from the solid oxide regenerative fuel cell to methane and water vapor and to transfer heat from an outlet stream to the inlet stream when the solid oxide regenerative fuel cell operates in the electrolysis mode.

9. The system of claim 1, further comprising a renewable energy source.

10. The system of claim 9, wherein:

the renewable energy source comprises a solar cell or a wind turbine electrically connected to the solid oxide regenerative fuel cell;

the solid oxide regenerative fuel cell is adapted to generate power in a fuel cell mode when the renewable energy source is not generating power; and the solid oxide regenerative fuel cell is adapted to generate oxygen and fuel in electrolysis mode when power is provided to the solid oxide regenerative fuel cell from the renewable energy source.

11. A terrestrial solid oxide regenerative fuel cell system, comprising:

a solid oxide regenerative fuel cell; and a first means for providing oxygen from the solid oxide regenerative fuel cell to a life support system when the solid oxide regenerative fuel cell is operated in an electrolysis mode; and a second means for providing hydrocarbon fuel to be stored in a hydrocarbon fuel storage vessel when the solid oxide regenerative fuel cell is operated in the electrolysis mode.

12. The system of claim 11, further comprising:

a third means for providing power to a power distribution system when the solid oxide regenerative fuel cell is operated in a fuel cell mode.

13. The system of claim 12, wherein the system is located in at least one of the following locations selected from a group consisting of a high altitude aircraft that is adapted to operate in an airless environment, a terrestrial orbit space craft that is adapted to operate in an airless environment, an underground location that lacks access to atmospheric air, an underwater location that lacks access to atmospheric air and a building at least a portion of which can be sealed from outside atmosphere.

14. The system of claim 12, wherein the system comprises:

the first means for providing oxygen from the solid oxide regenerative fuel cell to a life support system when the solid oxide regenerative fuel cell is operated in an electrolysis mode; and the second means for providing hydrocarbon fuel to be stored in a hydrocarbon fuel storage vessel when the solid oxide regenerative fuel cell is operated in the electrolysis mode.

15. The system of claim 12, wherein the system comprises the first means for providing oxygen from the solid oxide regenerative fuel cell to a life support system when the solid oxide regenerative fuel cell is operated in an electrolysis mode.

16. The system of claim 12, wherein the system comprises the second means for providing hydrocarbon fuel to be stored in a hydrocarbon fuel storage vessel when the solid oxide regenerative fuel cell is operated in the electrolysis mode.

17. A terrestrial power generation system, comprising:

a solid oxide regenerative fuel cell;

a Sabatier reactor which converts hydrogen and carbon monoxide emitted from the solid oxide regenerative fuel cell operating in an electrolysis mode to methane and water vapor;

a methane fuel source connected to the solid oxide regenerative fuel cell fuel inlet, wherein the methane fuel source provides a methane fuel to the solid oxide regenerative fuel cell operating in a fuel cell mode and wherein the methane fuel source receives methane from the Sabatier reactor; and an oxygen source connected to the solid oxide regenerative fuel cell oxidizer inlet.

18. The system of claim 17, wherein:

the solid oxide regenerative fuel cell is adapted to generate power in a fuel cell mode from stored oxygen supplied from the oxygen source and from fuel supplied from the methane fuel source; and the solid oxide regenerative fuel cell is adapted to generate metabolic oxygen for a life support system in the electrolysis mode when power is provided to the solid oxide regenerative fuel cell.

19. The system of claim 18, wherein the system is located in an underwater vehicle.

20. The system of claim 18, wherein the system is located in a high altitude aircraft or terrestrial orbit space craft that is adapted to operate in rarefied air or an airless environment.

21. The system of claim 18, wherein the system is located in an underground or underwater location that lacks access to atmospheric air.

22. The system of claim 18, wherein:
- the methane fuel source comprises a methane storage vessel which is adapted to store methane generated from an output of the solid oxide fuel cell operating in the electrolysis mode and which is adapted to supply methane to the solid oxide fuel cell operating in the fuel cell mode;
- the oxygen source comprises an oxygen storage vessel;
- the solid oxide regenerative fuel cell is adapted to generate power in the fuel cell mode by converting oxygen and methane into carbon dioxide and water vapor;
- the solid oxide regenerative fuel cell is adapted to generate the metabolic oxygen for the life support system in the electrolysis mode when power, water vapor and carbon dioxide are provided to the solid oxide regenerative fuel cell; and
- the solid oxide regenerative fuel cell is adapted to generate heat in the fuel cell mode and in the electrolysis mode.

23. The system of claim 17, further comprising:
- a plurality of solid oxide regenerative fuel cell stacks; and
- a carbon dioxide storage vessel connected to the solid oxide regenerative fuel cell.

24. The system of claim 23, further comprising a hydrogen recovery unit adapted to recover hydrogen from the fuel exhaust and to provide the recovered hydrogen into the fuel inlet stream when the solid oxide regenerative fuel cell operates in the fuel cell and electrolysis modes.

25. The system of claim 17, further comprising a renewable energy source.

26. The system of claim 25, wherein:
- the renewable energy source comprises a solar cell or a wind turbine electrically connected to the solid oxide regenerative fuel cell;
- the solid oxide regenerative fuel cell is adapted to generate power in a fuel cell mode when the renewable energy source is not generating power; and
- the solid oxide regenerative fuel cell is adapted to generate oxygen and fuel in electrolysis mode when power is provided to the solid oxide regenerative fuel cell from the renewable energy source.

27. A terrestrial power generation system, comprising:
- a solid oxide regenerative fuel cell;
- a first means for converting hydrogen and carbon monoxide emitted from the solid oxide regenerative fuel cell operating in an electrolysis mode to methane fuel and water vapor;
- a second means for storing the methane fuel provided from the first means when the solid oxide regenerative fuel cell operates in the electrolysis mode and for providing the stored methane fuel to the solid oxide regenerative fuel cell when the solid oxide regenerative fuel cell operates in a fuel cell mode; and
- an oxygen source connected to the solid oxide regenerative fuel cell oxidizer inlet.

28. The system of claim 27, further comprising:
- a third means for providing oxygen from the solid oxide regenerative fuel cell to a life support system when the solid oxide regenerative fuel cell is operated in the electrolysis mode; and
- a fourth means for providing power to a power distribution system when the solid oxide regenerative fuel cell is operated in a fuel cell mode.

29. The system of claim 27, further comprising a fifth means for providing carbon dioxide to the solid oxide regenerative fuel cell when the solid oxide regenerative fuel cell is operating in the electrolysis mode.

30. The system of claim 29, wherein the fifth means comprises a carbon dioxide storage vessel adapted to store carbon dioxide generated by the solid oxide regenerative fuel cell operating in a fuel cell mode.

* * * * *